US010526227B2

(12) United States Patent
Aboud et al.

(10) Patent No.: US 10,526,227 B2
(45) Date of Patent: Jan. 7, 2020

(54) WASTEWATER TREATMENT AND SOLIDS RECLAMATION SYSTEM

(71) Applicant: Creative Water Solutions, LLC, Jacksonville, FL (US)

(72) Inventors: Richard Aboud, Jacksonville, FL (US); Thomas Hart, Doraville, GA (US); Ronald W. Bennetti, Sr., Rome, GA (US); David A. Penz, Cumming, GA (US)

(73) Assignee: Creative Water Solutions, LLC, Jacksonville, FL (US)

( * ) Notice: Subject to any disclaimer, the term of this patent is extended or adjusted under 35 U.S.C. 154(b) by 86 days.

(21) Appl. No.: 15/591,333

(22) Filed: May 10, 2017

(65) Prior Publication Data

US 2018/0327295 A1 Nov. 15, 2018

(51) Int. Cl.
*C02F 9/00* (2006.01)
*B01D 29/27* (2006.01)
(Continued)

(52) U.S. Cl.
CPC .............. *C02F 9/005* (2013.01); *B01D 29/27* (2013.01); *B01D 29/52* (2013.01); *B01D 29/56* (2013.01); *B01D 61/027* (2013.01); *B01D 61/147* (2013.01); *B01D 65/02* (2013.01); *B01D 2321/04* (2013.01); *C02F 1/004* (2013.01); *C02F 1/325* (2013.01); *C02F 1/442* (2013.01); *C02F 1/444* (2013.01); *C02F 1/463* (2013.01); *C02F 1/66* (2013.01); *C02F 1/72* (2013.01); *C02F 2001/007* (2013.01); *C02F 2101/10* (2013.01); *C02F 2101/32* (2013.01);
(Continued)

(58) Field of Classification Search
None
See application file for complete search history.

(56) References Cited

U.S. PATENT DOCUMENTS 6,238,546 B1 * 5/2001 Knieper .............. C02F 1/46104
204/269
9,322,258 B2 4/2016 Henson et al.
(Continued)

FOREIGN PATENT DOCUMENTS

KR 100943987 3/2010
KR 101488283 1/2015
(Continued)

OTHER PUBLICATIONS

KR100943987 Machine Translation—Espacenet machine translation—Lee Jae Chang et al—Mar. 2, 2010 (Year: 2010).*
(Continued)

*Primary Examiner* — Bradley R Spies
(74) *Attorney, Agent, or Firm* — Squire Patton Boggs US LLP

(57) ABSTRACT

A fixed or mobile water treatment system comprises a primary screening tank that filters wastewater to remove inorganic and organic pollutants from the wastewater, and includes an electro-coagulation unit that provides an electrical charge to wastewater exiting the primary screening tank, ultraviolet light and oxidation processes in one or more settling tanks that remove pollutants from the wastewater, and one or more filters that remove pollutants from the wastewater.

25 Claims, 8 Drawing Sheets

(51) Int. Cl.
    *B01D 61/02*     (2006.01)
    *B01D 61/14*     (2006.01)
    *C02F 1/463*     (2006.01)
    *C02F 103/36*     (2006.01)
    *C02F 1/00*     (2006.01)
    *C02F 1/44*     (2006.01)
    *C02F 1/32*     (2006.01)
    *C02F 1/72*     (2006.01)
    *B01D 29/52*     (2006.01)
    *B01D 29/56*     (2006.01)
    *B01D 65/02*     (2006.01)
    *C02F 101/32*     (2006.01)
    *C02F 101/10*     (2006.01)
    *C02F 1/66*     (2006.01)

(52) U.S. Cl.
    CPC .. *C02F 2101/322* (2013.01); *C02F 2103/365* (2013.01); *C02F 2201/008* (2013.01); *C02F 2209/07* (2013.01); *C02F 2301/046* (2013.01); *C02F 2303/16* (2013.01)

(56) References Cited

U.S. PATENT DOCUMENTS

| | | | | |
|---|---|---|---|---|
| 2002/0056688 A1* | 5/2002 | Stephenson | ............ | C02F 1/463 210/704 |
| 2005/0098491 A1* | 5/2005 | Carlotto | ................. | C02F 9/005 210/232 |
| 2012/0160706 A1 | 6/2012 | Poirier | | |
| 2013/0126174 A1* | 5/2013 | Henson | ................... | E21B 43/26 166/308.1 |
| 2013/0126427 A1* | 5/2013 | Jones | ...................... | C02F 3/006 210/615 |
| 2013/0236840 A1* | 9/2013 | Maslov | ..................... | F23G 5/46 431/11 |
| 2014/0116948 A1 | 5/2014 | Meyer | | |
| 2014/0116967 A1 | 5/2014 | Smith et al. | | |
| 2015/0315055 A1* | 11/2015 | Chidambaran | ............ | C02F 9/00 166/266 |
| 2017/0113952 A1* | 4/2017 | Stephenson | ............ | B01D 21/00 |
| 2018/0009681 A1* | 1/2018 | Cam | .................. | B01D 17/0211 |

FOREIGN PATENT DOCUMENTS

| | | |
|---|---|---|
| KR | 1020160148284 | 12/2016 |
| KR | 101705544 | 2/2017 |

OTHER PUBLICATIONS

Written Opinion; Corresponding PCT Application No. PCT/US2018/031533; International Filing Date May 8, 2018; Authorized Officer MIN; dated Aug. 28, 2018.

International Search Report; Corresponding PCT Application No. PCT/US2018/031533; International Filing Date May 8, 2018; Authorized Officer MIN; dated Aug. 29, 2018.

* cited by examiner

WASTEWATER TREATMENT AND SOLIDS RECLAMATION SYSTEM

FIELD OF INVENTION

The present disclosure is related to purification systems for contaminated fresh water. More specifically, the present disclosure is related to purification systems for petroleum contact water. Additionally, the system of the present disclosure is also used to reclaim solids from water.

BACKGROUND

Historically, fresh water has been treated as an unlimited natural resource usually controlled by governments in most parts of the world. The low price of water coupled with the difficulty in moving water over great distances serves to keep most fresh water use local. As both use and population increase, fresh water resources can reach their natural limit in some areas. Price increases normally follow.

In many parts of the world, water is a critically limiting resource. Water is necessary for urban development (including personal use), agriculture, industry, landscaping, and consumptive uses (oil and natural gas development). In those areas with limited fresh water resources, the competing water uses are often allocated hierarchically. This allocation structure usually places personal use as the top priority and industrial use at the bottom.

Economic growth demands a reliable and cost effective supply of both water and energy. With industrial uses at or near the bottom of the priority list, industry is often left to seek out new ways to decrease water use while also searching for other sources of water such as wells. One of the more difficult problems of current-day governments and society in general is to balance the needs of economic growth and environmental protection. Thus, there is a significant need for water production that benefits economic growth without significantly detracting from the water environment.

Petroleum contact water is one particular category of industrial wastewater, and may be defined as water containing petroleum product. Examples of petroleum contact water include, without limitation: (1) condensate from underground and aboveground petroleum tanks; (2) water bottoms or drawdown water removed from a petroleum storage tank system; (3) water in contact with petroleum product that displays a visible sheen contained in spill containment and secondary containment areas associated with petroleum tank storage, petroleum transportation, and petroleum distribution systems; (4) petroleum tank filler sump and dispenser sump water; and (5) recovered petroleum product or water in contact with petroleum product, which does not contain hazardous constituents other than petroleum, from first response actions to petroleum spills or from petroleum contamination site cleanups.

Existing water treatment systems are inefficient and fail to provide an adequate flow of wastewater through the water treatment system. These existing water treatment systems may use batch processes, consume large volumes or land areas, or require long periods of time to remove and consolidate contaminants sufficiently for convenient disposal. Thus, a need exists for a water treatment system that can maintain an optimal water flow while removing particulate contaminates and petroleum products from the wastewater.

SUMMARY

In one embodiment, a water treatment system includes a primary tank configured to receive wastewater, the primary tank including a strainer that intercepts particles in the wastewater. The primary tank includes a settling chamber for collecting particles that separate from the wastewater. The system includes an electro-coagulation unit configured to receive wastewater exiting the primary tank and generate metal hydroxides in the wastewater. The system further includes a secondary tank that receives wastewater from the electro-coagulation unit, the secondary tank configured to coagulate, separate and drain particulate pollutants in the wastewater, and collect, vent and destroy volatile gaseous pollutants. The system also has an initial filter that receives wastewater from the secondary tank, the initial filter configured to remove pollutants on the order of 1-5 microns. The system also includes a tertiary tank that receives wastewater from the initial filter, the tertiary tank configured to separate and drain pollutants in the wastewater, and an additional bag filter that receives wastewater from the tertiary tank, the additional bag filter configured to remove pollutants on the order of 1-5 microns. The system further includes a microfilter that receives wastewater from the additional bag filter, the microfilter configured to remove pollutants on the order of 0.1-10 microns, and a quaternary tank that receives wastewater from the microfilter, the quaternary tank configured to separate and drain pollutants in the wastewater. The system further includes a nanofilter that receives wastewater from the quaternary tank, the nanofilter configured to remove pollutants on the order of 1-10 nanometers.

The water treatment system may further include a backwash system configured to pump a cleaning solution through the microfilter and the nanofilter, in a direction opposite to a wastewater intake direction. The system may further include an acid dosing system and a base dosing system connected to the primary tank. The system may further include an ultraviolet light generator configured to expose wastewater to ultraviolet light. A portion of the wastewater exiting the microfilter may be re-circulated to the tertiary tank or to the inlet of the microfilter. A portion of the wastewater exiting the nanofilter may be re-circulated to the quaternary tank or to the inlet of the nanofilter. The primary, secondary, tertiary, and quaternary tanks may provide concentrated wastewater to a discharge drum. The discharge drum may provide supernatant water to the primary tank. The water treatment system may further include an oxidizer that oxidizes wastewater exiting the electro-coagulation unit.

In another embodiment, a mobile water treatment system includes a primary screening tank that filters wastewater to remove non-organic particles from the wastewater, an electro-coagulation unit that provides an electrical charge to wastewater exiting the primary screening tank, one or more settling tanks that remove pollutants from the wastewater, and one or more filters that remove pollutants from the wastewater. The settling tanks may provide concentrated wastewater to a discharge drum.

The mobile water treatment system of this embodiment may further include a backwash system configured to clean at least one of the filters. The backwash system may provide backwash wastewater to the primary screening tank. The one or more filters may include one or more microfilters and one or more nanofilters. The electro-coagulation unit may be one or more electro-coagulation units arranged in parallel. The system of this embodiment may further include an ultraviolet light generator configured to expose wastewater to ultraviolet light.

In yet another embodiment, a method for treating wastewater includes the steps of providing wastewater to a primary screening tank, removing large pollutants from the wastewater in the primary screening tank, providing wastewater to an electro-coagulation unit, generating metal hydroxides in the wastewater, providing wastewater to one or more settling tanks to allow pollutants in the wastewater to settle at the bottom of the settling tanks, providing wastewater to one or more filters to remove pollutants from the wastewater, collecting concentrated wastewater from each settling tank, and providing the collected concentrated wastewater from the settling tanks to the primary screening tank.

The method of this embodiment may further include a step of adjusting the pH level of the wastewater in the primary screening tank. The method for treating wastewater may further include a step of oxidizing the wastewater. The method for treating wastewater may further include a step of cleaning the filters with a backwash system. The method for treating wastewater may further include a step of re-circulating a portion of the wastewater exiting a filter to a settling tank or to the filter inlet. The method may further include a step of exposing the wastewater to ultraviolet light.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
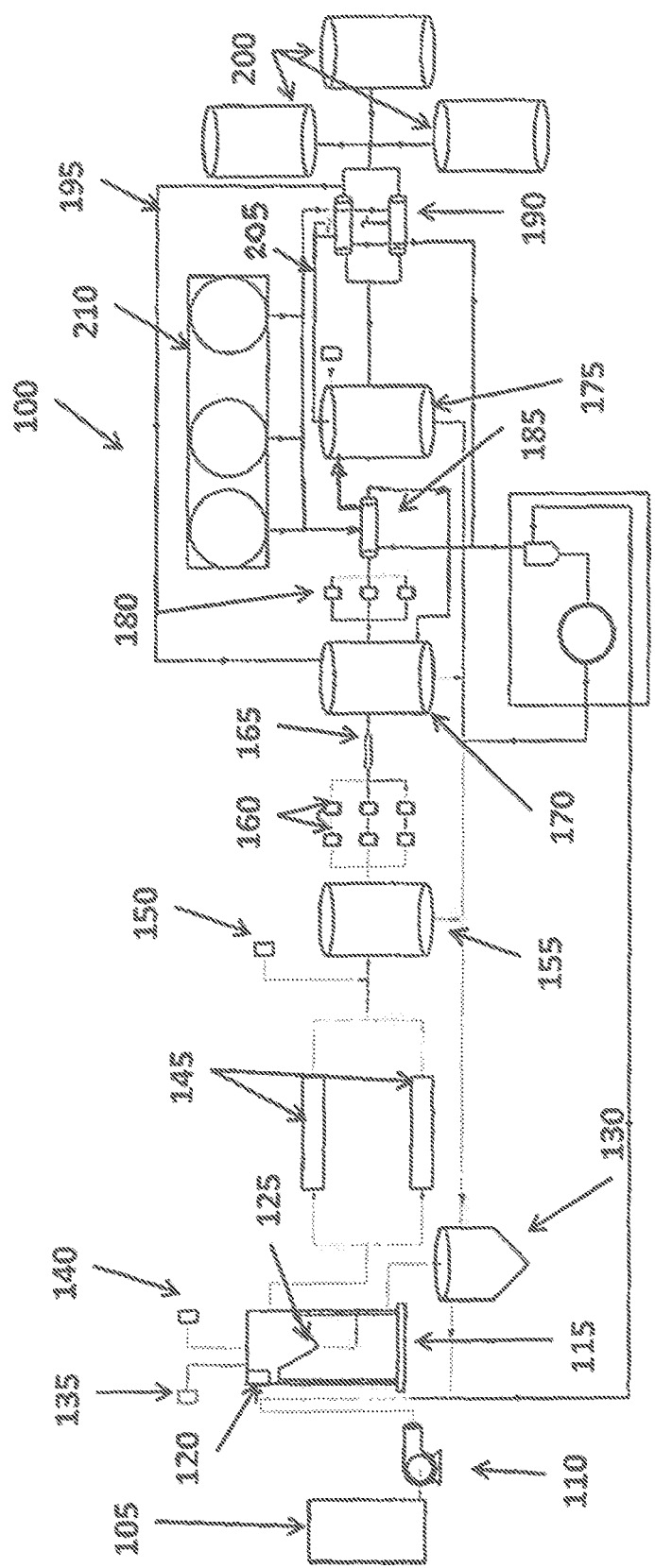
FIG. 1 is a schematic diagram of the water treatment system according to an embodiment of the present disclosure.

FIG. 1 is a diagram of a water treatment system 100 according to an embodiment of the present disclosure. Water treatment system 100 is designed to treat contaminated water, for example, water containing biological, solid, gaseous, or chemical contaminants or petroleum products. The primary pollutants of concern in the wastewater typically consist of volatile and semi-volatile organic compounds and metals such as copper, lead, zinc, tin, chromium, and cobalt. Other pollutants of concern may include oxygen-demanding compounds, nitrogen and phosphorous, oil and grease, and pathogens. The water treatment system of the present disclosure is not limited to the aforementioned pollutants, and those of skill in the art will recognize that the water treatment system can be used to remove other types of pollutants as well.

Water treatment system 100 can be implemented as a mobile system, with the components being located on one or more mobile trailers or skids. Alternatively, some portions of the water treatment system 100 can be mobile, while other parts are fixed or located at a work site. Alternatively, all portions of the water treatment system 100 can be fixed or located at the work site. Details of water treatment system 100 are discussed by section below.

Figure 2:
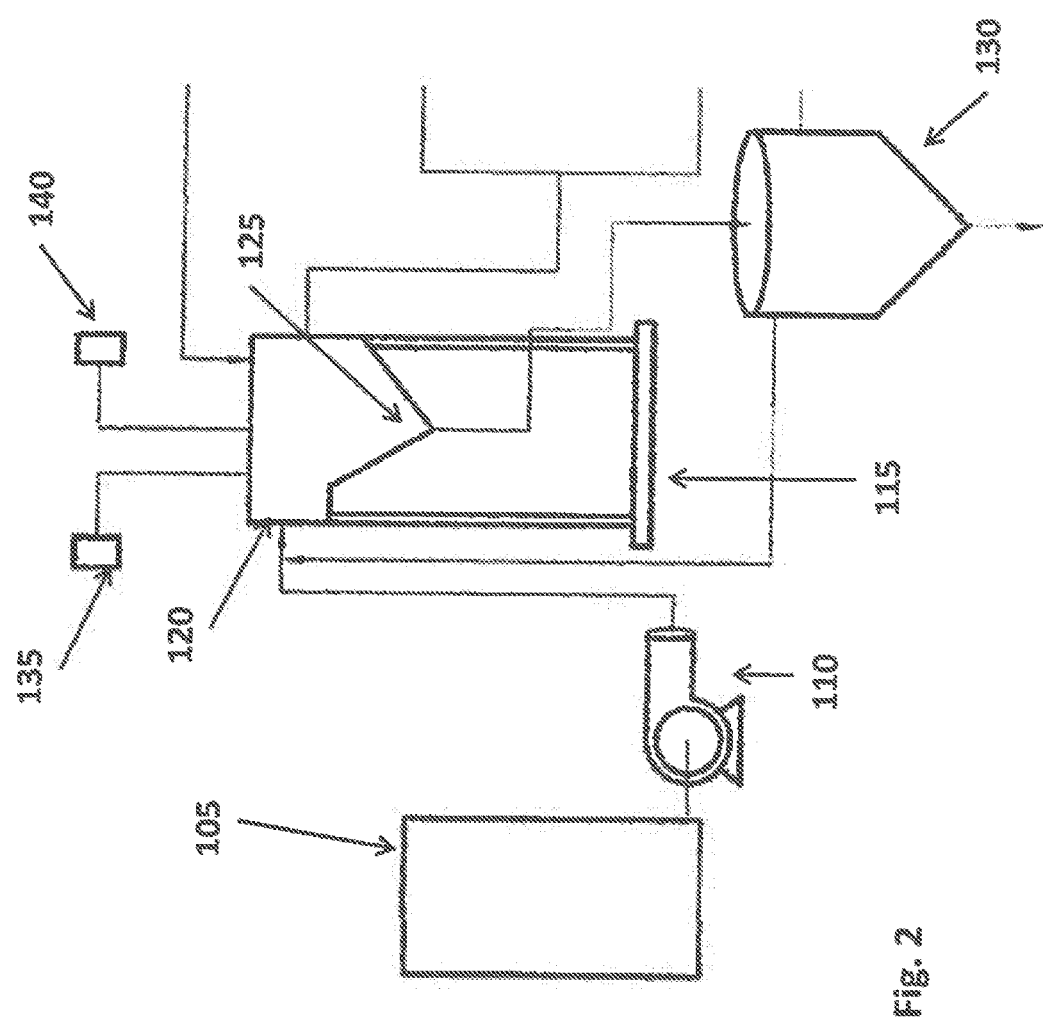
FIG. 2 is a partial schematic diagram of the embodiment of FIG. 1, focusing on the initial treatment portion of the water treatment system.

FIG. 2 illustrates a partial view of water treatment system 100, focusing on an initial filtration portion of the system. Water treatment system 100 includes an influent storage tank 105, which stores untreated wastewater. The influent storage tank 105 can be located at or near a project site where the water treatment system 100 will be implemented. In other embodiments (not shown), the influent storage tank 105 can have a greater or lesser capacity, can be located in-ground, can be a well, or can be a ground reservoir.

Influent pump 110 draws wastewater from the influent storage tank 105 and delivers it via a conduit to primary screening and sedimentation tank 115 (also called "primary tank 115."). In alternative embodiments (not shown), a coarse filter (not shown) is located between the influent storage tank 105 and the primary tank 115, to remove large pieces of material from the wastewater.

Primary tank 115 is configured to remove debris, insolvent solids and liquids, settling sand, grit or other particles or insolvent liquids having a high specific gravity or floating low specific gravity liquids and debris. Primary tank 115 also allows manipulation of the pH to aid the physical separation process. In this embodiment, the primary tank 115 is approximately 200 gallons, but can be larger or smaller in other alternative embodiments, depending on the scale of the operation.

The intake wastewater is filtered by a strainer basket (also referred to as a "strainer") 120. The primary tank 115 includes a baffle that intercepts the aforementioned particles and a hopper 125 that collects separated particles. The hopper 125 then discharges the particles on an as-needed basis to a discharge drum 130. Supernatant collected in this process is circulated from the discharge drum 130 back to the intake of the primary tank 115. The solids collected in discharge drum 130 are discharged for disposal. In alternative embodiments (not shown), the strainer basket can be replaced by a screen.

The hydraulic residence time of the primary tank 115 is approximately 20 minutes at a flow rate of 10 gallons per minute, in this embodiment. Hydraulic residence time refers to the average length of time that a water particle spends inside of the primary tank 115. In other alternative embodiments (not shown), the hydraulic residence time or flow rate can vary according to the application requirements.

In the present embodiment, the primary tank 115 also includes an acid/base dosing system, such as an HCL ("hydrochloric acid") dosing system 135 and a KOH ("potassium hydroxide") dosing system 140 (collectively, "dosing systems"). Dosing systems 135, 140 are used to adjust the pH (acidity/alkalinity) level in the primary tank 115. Adjustment of pH aids the removal of inorganic particles and non-soluble organic liquids and solids. The dosing systems 135, 140 each include a variable rate dosing pump and a chemical reservoir, and are controlled by a central control system (not shown). Sensors (not shown) are used to measure the acidity or alkalinity of the intake water, and these measurements are fed back to the central control system, which uses the measurements to adjust the dosing systems output accordingly. This process can be either automated or manually controlled by an operator.

Figure 3:
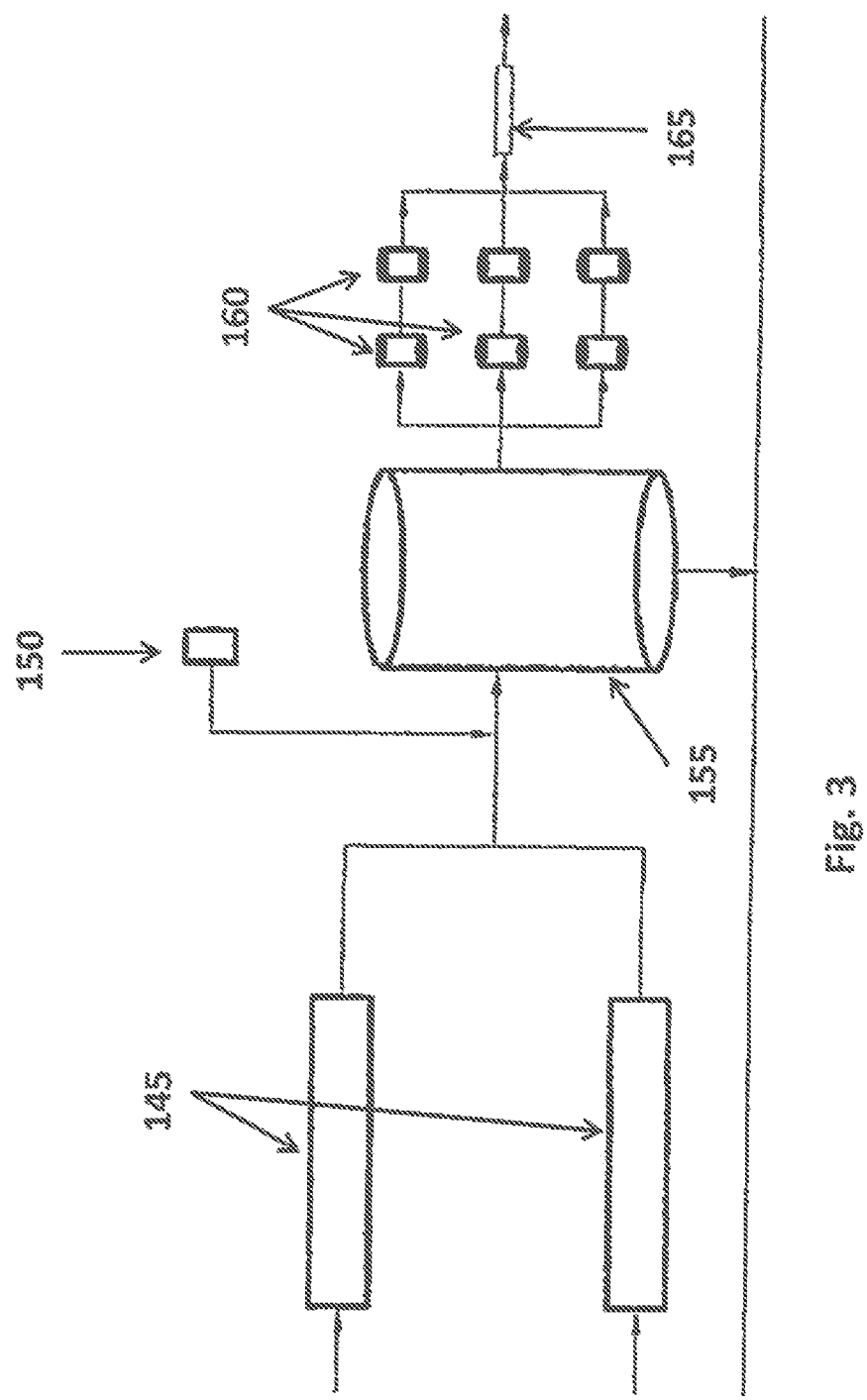
FIG. 3 is a partial schematic diagram of the embodiment of FIG. 1, focusing on the electrical coagulation portion of the water treatment system.

FIG. 3 illustrates the next portion of water treatment system 100, focusing on electro-coagulation units 145. The outtake water from the primary tank 115 flows into two parallel-flow electro-coagulation units ("EC units") 145. EC units 145 reduce the surface charge of pollutant particles and promote coagulation of the particles. The EC units 145 use an electro-chemical process to generate principally iron fe++ (or alternate metal source) and hydroxyl groups which cause several simultaneous chemical and physical interactions with contaminants. Metal hydroxide complexes form, which cause precipitation and flocculation of these inorganic and organic molecules. The process typically involves providing an electrical charge to a set of ferrous electrode plates submerged in the wastewater flow, which creates metal hydroxides within the water that promote particle coagulation. The coagulation of these particles increases the particle mass, allowing gravitational forces to act on the particles for settling and filtering purposes. In the present embodiment, the EC units are mounted to a skid system, but in other embodiments can be mounted in other locations. In alternative embodiments (not shown), electrode plates could be aluminum or other metallic materials or a combination of different plate materials.

FIG. 3 also includes an oxidizer feed 150, which provides hydrogen peroxide ($H_2O_2$) to wastewater after passing through the EC units 145. The hydrogen peroxide promotes coagulation of dissolved petroleum compounds. The hydrogen peroxide performs two functions: 1) oxidizing organic compounds using fe++ from the electro-chemical units as a catalyst, to act as a fentons reaction with the petroleum hydrocarbons, and 2) disinfecting the contaminated water by oxidizing organic contaminants such as bacteria. In alternative embodiments (not shown), the oxidizer feed 150 can be omitted.

FIG. 3 also shows a secondary tank 155, which receives wastewater after it has passed through the EC units 145 and oxidizer feed 150. The aggregate particles in wastewater settle in the bottom of secondary tank 155 during the time that wastewater is resident. The residence time of wastewater in secondary tank 155 is approximately 30 minutes with a flow of 10 gallons per minute. The hydraulic residence time or flow rate can be varied depending on the application needs. In the present embodiment, secondary tank 155 has a volume of approximately 300 gallons, but in other embodiments the volume can vary according to the needs of the application.

After passing through secondary tank 155, wastewater enters a series of bag filters 160, arranged in a combination of both series and parallel flows. In alternative embodiments (not shown), the bag filters can be arranged in only series or only parallel. In the illustrated embodiment, six bag filters are employed. But it should be understood that any number of bag filters may be used. The bag filters 160 contain fabric media elements with a pore size of about 1 to 5 microns, and the wastewater flows through these filters by gravity to remove particles larger than the pore size of the filters. A bag filter in this embodiment refers to closed, surface type particulate filter. "Closed" in this context means that the fluid flow is pressurized and not opened to the atmosphere. "Surface" in this context means a filter that collects a layer of particulate cake on the surface of a filter element. In alternative embodiments (not shown), the pore size can be smaller or greater than 1 to 5 microns, for example 0.5 microns or 6 microns. In alternative embodiments (not shown), a pump can pass the wastewater through the bag filters. In alternative embodiments (not shown), filters other than bag filters may be used. A filter may be selected based on the throughput flow rate, the degree of filtration desired, the nature of the contaminated influent stream, or cost considerations. Exemplary cost considerations include the cost of cleaning a filter versus the costs of exchanging a filter.

Examples of other filters that may be used in place of bag filters include, without limitation, "open" filters, where the media in the tank is open to the atmosphere with flow by gravity, "depth" type filters, where particulate collects throughout the volume of a cartridge element, a "strainer", which collects large debris to protect downstream pipes and valves, a "bed" type filter, which uses roll media, and a centrifugal filter, which separates particulate using centrifugal forces.

After the wastewater passes through bag filters 160, the water is exposed to an ultraviolet light 165. In this application, the ultraviolet light has two beneficial functions. First, $H_2O_2$ and ultraviolet light form two free hydroxyl radicals. The radicals are strong oxidizing agents which form carbon dioxide ($CO_2$), water ($H_2O$) and salts of dissolved organic contaminants. The extremely reactive hydroxyl radicals combine with ozone to react with dissolved organics. Second, the ultraviolet light removes any excess peroxide remaining from secondary tank 155. In alternative embodiments (not shown), ultraviolet light can be omitted.

Figure 4:
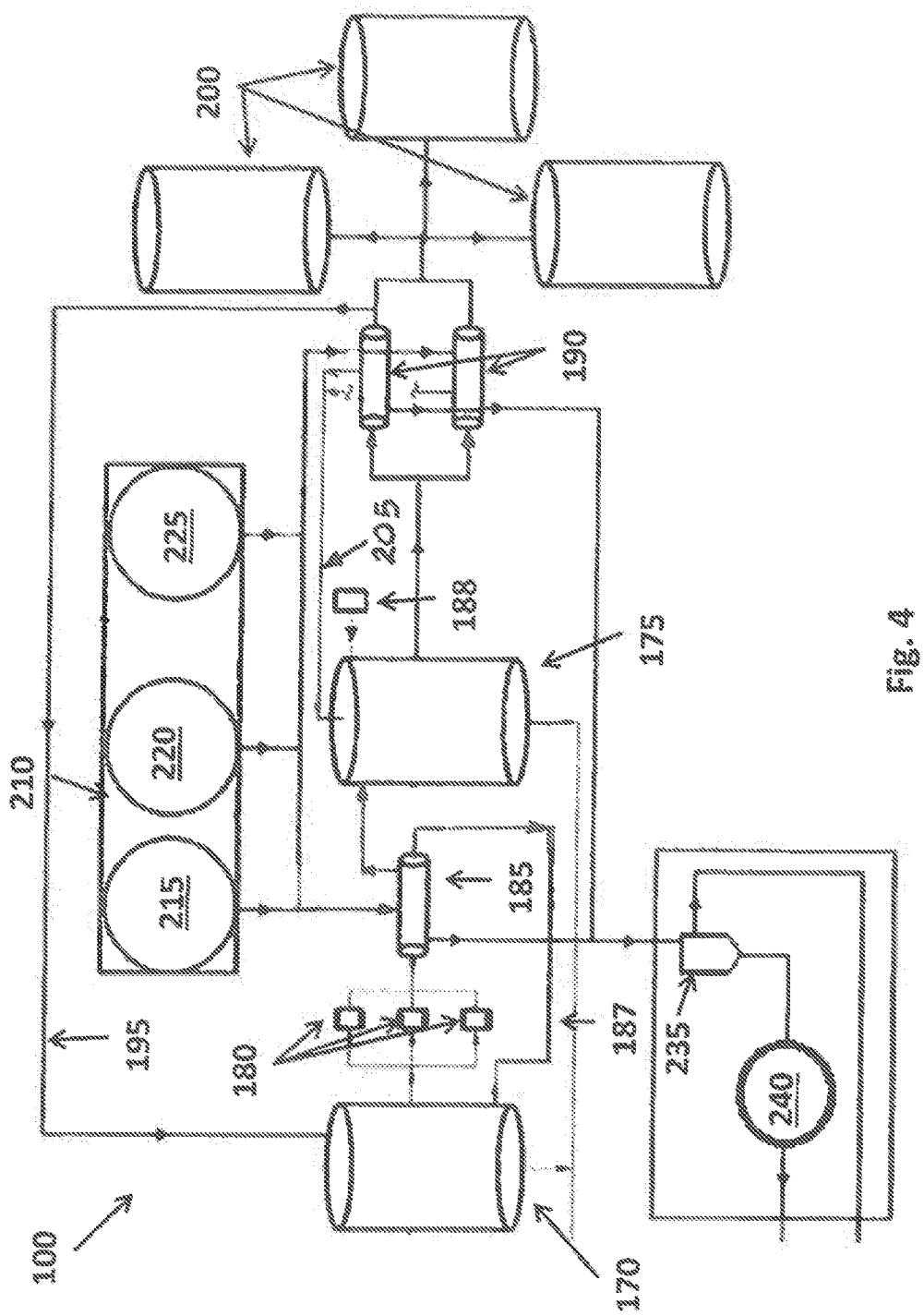
FIG. 4 is a partial schematic diagram of the embodiment of FIG. 1, focusing on the microfiltration, nanofiltration, and backwash portions of the water treatment system.

FIG. 4 shows a portion of the water treatment system 100 including tertiary tank 170 and quaternary tank 175. Tertiary tank 170 receives the wastewater after the water receives exposure to ultraviolet light 165. The wastewater in tertiary tank 170 contains peroxide and ozone plus oxygen and hydroxide radicals produced by the ultraviolet light. Reaction products include gases ($CO_2$, $O_2$, etc), floc and sediment composed of insoluble reactants. Tertiary tank 170 is the final reaction vessel before final filtering, polishing and pH adjustment. Tertiary tank 170 in this embodiment has a volume of approximately 120 gallons and a hydraulic retention time of approximately 12 minutes at a flow rate of 10 gallons per minute. In alternative embodiments (not shown), the tertiary tank can have a different volume, flow rate, or hydraulic retention time.

Wastewater exiting tertiary tank 170 passes through a booster pump (not shown), that forces the wastewater through parallel bag filters 180 and a microfilter 185. The booster pump further increases the pressure of wastewater. Bag filters 180 remove particles typically sized from 1 to 5 microns, and microfilter 185 removes particles typically sized from 0.1 to 10 microns. In the illustrated embodiment, three bag filters 180 are employed. In alternative embodiments (not shown), any number of bag filters may be employed.

Microfilters 185 in this embodiment are closed filters that use depth-type ceramic media, to collect particulate throughout the volume of the filter elements. Microfilters 185 typically operate at considerable pressure difference between the input and product streams. Microfilters 185 have two output streams, including the product stream and a larger through-flow stream that can be recycled or carried to other processes.

As seen in FIG. 4, the through-flow stream of wastewater is re-circulated back into tertiary tank 170 via re-circulation line 187 after passing through the microfilter 185, and the permeate (product stream) exiting microfilter 185 enters quaternary tank 175.

Quaternary tank 175 receives the product stream water exiting microfilter 185. Wastewater in quaternary tank 175 undergoes a final settling phase prior to moving downstream, and pollutants in the wastewater settle in the bottom of quaternary tank 175 while wastewater is resident in this tank. In the present embodiment, quaternary tank 175 has a volume of approximately 120 gallons, and a hydraulic retention time of approximately 12 minutes at a flow rate of 10 gallons per minute. Dosing system 188 can provide HCL or KOH. In alternative embodiments (not shown), the quaternary tank can have a different volume, hydraulic residence time, or flowrate depending on the application requirements.

After the wastewater exits quaternary tank 175, a booster pump (not shown) passes the wastewater on to two nanofilters 190 in a parallel flow. A booster pump may further increase the pressure of water entering nanofilters 190. Nanofilters 190 remove pollutant particles typically sized from 1 to 10 nanometers. In an alternative embodiment (not shown), a single nanofilter may be employed. In another alternative embodiment (not shown), three or more nanofilters may be employed.

Nanofilters 190 are a type of membrane separator. A portion of the influent water passes through the membrane, under considerable pressure difference, and exits as clean "permeate" or product water. Product water passes to product water holding tanks 200 or to other apparatus for other uses.

Through-flow wastewater exiting nanofilters 190 is directed back into quaternary tank 175 through recirculation line 205. In a preferred embodiment, during periods of low wastewater flow (such as maintenance downtime or other out-of-service periods), product water may recirculate from the outlet of the nanofilter 190 back to tertiary tank 170 through bypass line 195. This maintains minimum flow through the piping in order to prevent biological fouling. In alternative embodiments (not shown), the through-flow wastewater can be re-circulated back to the intake of the nanofilters 190.

As best seen in FIG. 4, the water treatment system 100 further includes a backwash system 210 for implementing a cleaning process in microfilters and nanofilters. Periodically, the microfilters and nanofilters must receive a backwash treatment to maintain proper function. The backwash system 210 includes acid tank 215, fresh water tank 220, base tank 225, and pumps (not shown). Acid tank 215 holds an acid solution, base tank 225 holds a base solution, and fresh water tank 220 holds clean (treated) water.

A backwash cleaning procedure begins by isolating the filter or filters from the process, depressurizing the filters and draining them. Next, the acid solution in tank 215 is pumped through the filters in a direction opposite to the normal process direction. The solution is permitted to dwell within the filters for a set time. After the acid solution passes through the filters, it is drained to backwash tank 235 and then to basket strainer 240. Backwash tank 235 aids in further settling backwash water, so that the contaminants and pollutants fall to the bottom of the tank and move on to basket strainer 240. The filters are then backflushed with clean (treated) water from fresh water tank 220, and the clean water is permitted to dwell within the filters for a set time. After this step, the filters are backflushed with a base solution from base tank 225, and the base solution is permitted to dwell within the filters for a set time. Next, the filters are again backflushed with clean (treated) water from fresh water tank 220 and permitted to dwell for a set time. After the cleaning process is complete, the dirty water and settled contaminants in backwash tank 235 are pumped to the discharge drum 130. After the contaminants have settled at the bottom of backwash tank 235, the remaining water is pumped to the primary tank 115 to be passed through the wastewater treatment system 100 again. The filters are then re-connected to the main treatment process and the main treatment process continues. In this embodiment, the backwash system 210 is located external to the mobile system, but in other embodiments can be located on the mobile system.

All of the tanks 115, 155, 170, 175 further include a valve and drain for removing solids that accumulate in the bottom of the tanks during the settling process. The drains lead to a manifold pipe, which transfers the solids to discharge drum 130, while any supernatant water is pumped back into the primary tank 115 for further treatment. The solid waste can then be removed from discharge drum 130 and tested as needed prior to disposal. In alternative embodiments (not shown), the solids removed from the purified water can be collected and used in other applications.

Figure 5:
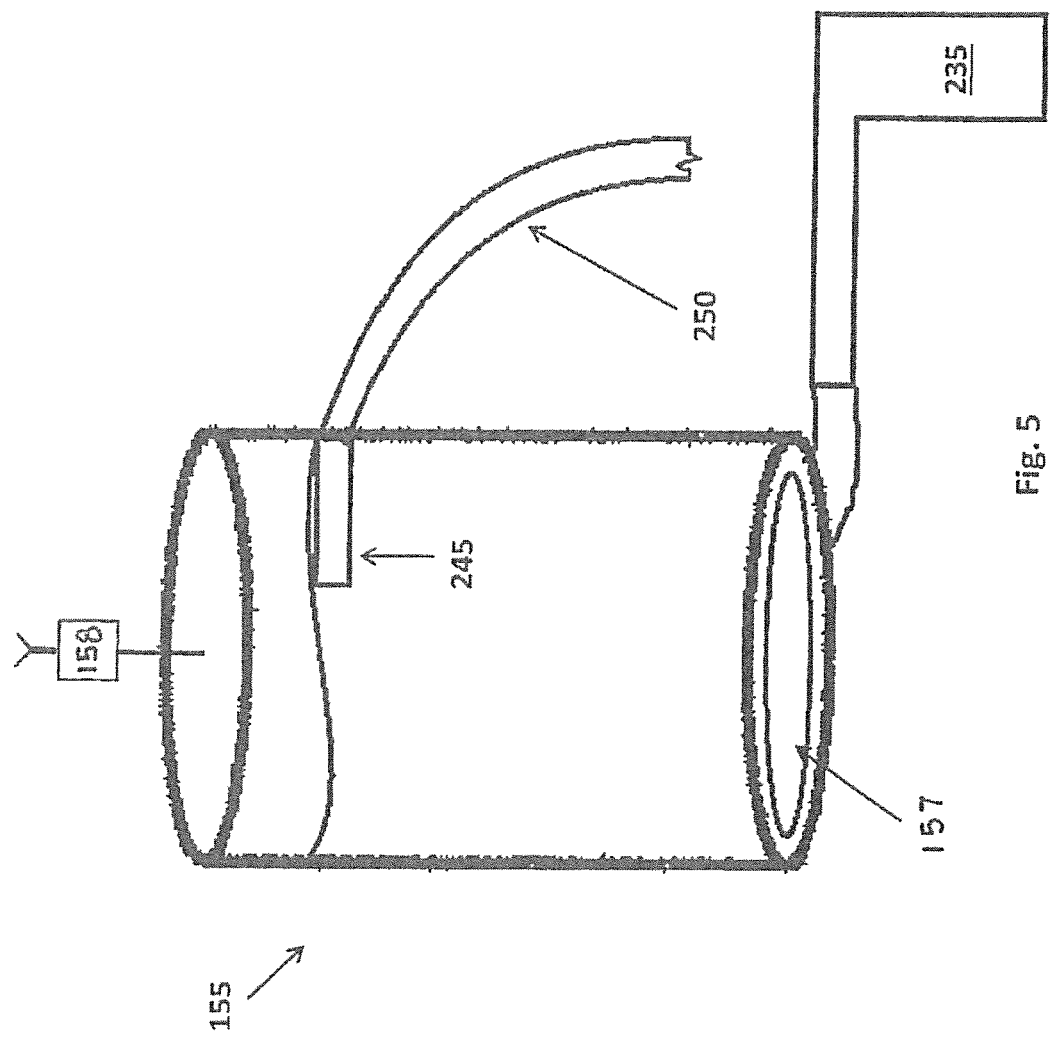
FIG. 5 is a detail view of the second tank in the embodiment of FIG. 1.

FIG. 5 is a detailed schematic view of secondary tank 155, with additional components shown. A key feature of the current water treatment system 100 is the flocculation process that occurs in secondary tank 155. A motorized blower 235 injects pressurized air through a distribution manifold 157 into the bottom of the secondary tank 155. Particulate contaminants agglomerate on the surfaces of rising air bubbles, and are taken to the surface of the liquid within secondary tank 155. The froth that collects at the top of the tank passes over a weir 245 and then down a sluice 250 into a gravity bed filter (not shown), where the contaminants are removed. The weir 245 and sluice 250 configured separate froth and liquid from the top surface of the secondary tank 155. Volatile gaseous contaminants may be released from the secondary tank 155, these gases including flammable or other noxious gases. Catalytic fume oxidizer 158, consisting of an exhaust blower, a regenerative thermal oxidizer and a vent stack, safely destroys contaminant gases before venting to atmosphere.

In alternative embodiments (not shown), at any of the filter locations described above, the water treatment system 100 may employ any or all of the above filter technologies described. The filter housing can have various capacities, in series or parallel, depending on the system design parameters. For a continuous process flow, extra housings in parallel would allow one or more filter units to be isolated from the process for cleaning or cartridge exchange, while maintaining full flow through other active filter units. Recycling the filter through-flow stream back to the filter inlets using a circulation pump reduces energy requirements, which is advantageous especially for larger systems with a greater throughput. Alternatively, the filter through-flow could be returned to an upstream tank, with filter pressure reduced through a valve or a throttling device.

The water treatment system 100 is a continuously flowing process, and can be adjusted to output purified water at a desired level of quality or cleanliness. The process parameters for the water treatment system 100 can be adjusted to optimize removal of particular contaminants. The process parameters include feed rate of the pumps and tanks, residence time of the water within each of the tanks, filter characteristics, and injection quantities for the additive processes. Nominal residence time is about 3-4 hours, but this time can vary.

To maintain a continuously flowing process, the water treatment system 100 must be actively controlled. One control approach is to measure all critical operating parameters electronically and employ a programmable logic controller ("PLC") or other computer-based control system to start, stop, and control the processes automatically. Another method would be to employ local mechanical or electronic indicators or gauges, and one or more human operators to control the process by adjusting pumps, valves, and other devices. Another method would consist of a combination of both automatic feedback control and manual controls. The PLC could also control the cleaning processes for the microfilters and nanofilters. In alternative embodiments, the backwash cleaning system could be provided in a portable cart and the cleaning process could be performed manually.

Operating parameters that can be regulated in the water treatment system 100 include fluid levels in tanks, filter differential pressures, water pH, process temperatures, water conductivity, pump speeds and head pressures, water flow rates and accumulated flows, chemical injection flow rates and accumulated flows, cleaning chemical solution flow rates and accumulated flows, and ozone injection flow rate. Discrete parameters that require monitoring or controlling include (but may not be limited to) the following: tank level alarms, process valve positions, pump motor status, electro-coagulator status, ozone injection status, filter status, and ultraviolet lamp status. Some post-treatment may be required for treated water that has passed through water treatment system 100. For instance, the final treated water may be too demineralized or deoxidized to support aquatic life, and should not be released into the natural environment without further treatment. Also, if brackish wastewater is being treated, the processed water may remain too saline for discharge into a freshwater system. In that case, a desalination facility would be necessary to connect downstream of the water treatment system.

Each batch of incoming wastewater should be tested to ensure that hazardous contaminants, such as mercury, radioactive substances or other contaminants, such as chlorine and other salts, in concentrations that the WTS has not been designed or set up to handle, are not present. Each batch of outgoing product water should be tested to ensure that pH balance has been obtained and that the water meets discharge quality requirements of the local jurisdiction.

Figure 6:
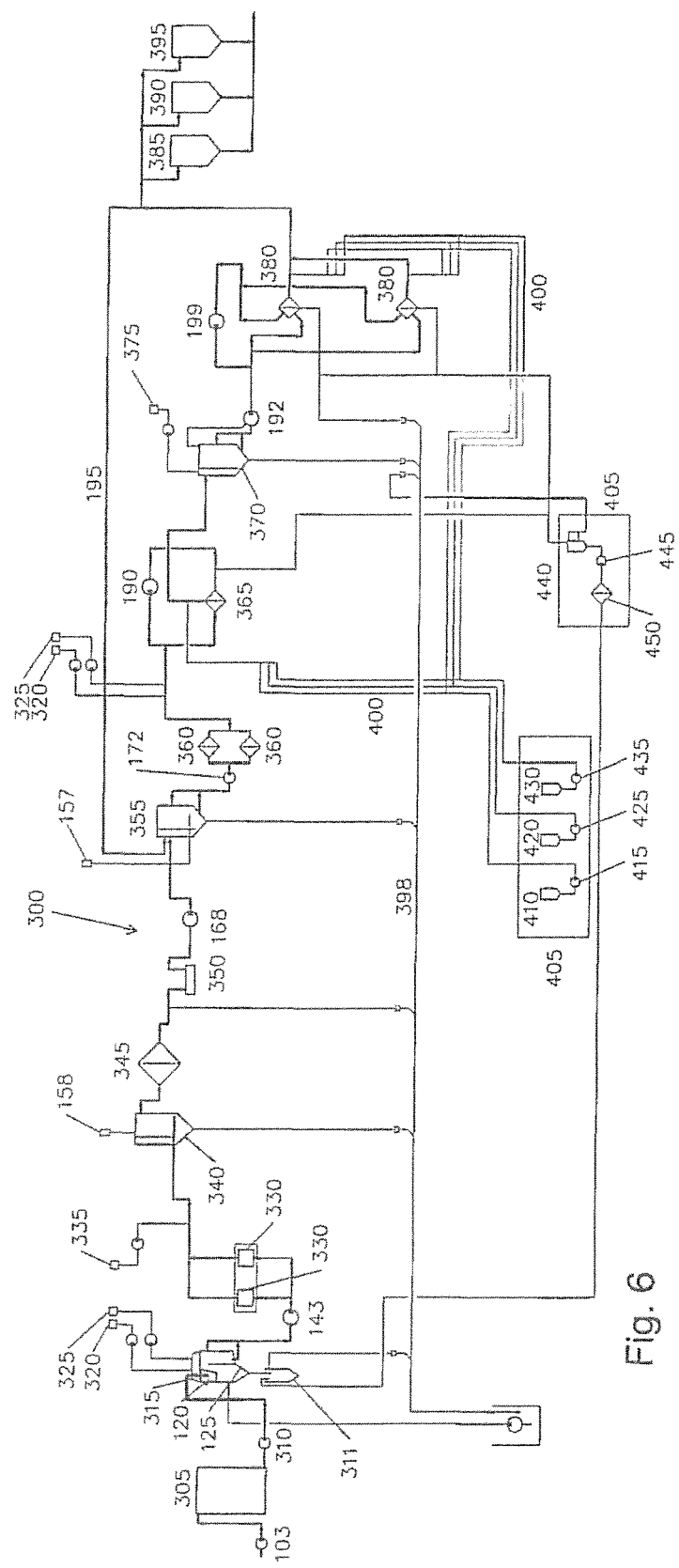
FIG. 6 is a diagram of a scaled-up version of the embodiment of the water treatment system of FIG. 1.

FIG. 6 illustrates a schematic drawing of another embodiment of a water treatment system 300, which is largely a scaled-up version of the water treatment system 100 discussed above. In one embodiment, the water treatment system 300 may treat water at a rate of 100 gallons per minute. In other embodiments, the water treatment system may treat water at an even higher rate.

Importantly, the water treatment system 300 may run continuously for an extended period of time, in addition to treating water at a high rate. In one known embodiment, the water treatment system 300 may treat water for 16 hours a day. Such a system treating water at a rate of 100 gallons per minute would treat 96,000 gallons of water per day. To effectively treat that volume of water, the system will need to operate with minimal maintenance. Thus, it is important to reduce the time that the system is shut down to replace, repair, or clean filters and other components.

Water treatment system 300 includes the same components as water treatment system 100, including: an influent storage tank 305, an influent pump 310, a primary screening and sedimentation tank 315 (having a strainer and/or a hopper), a discharge drum 311, an HCL dosing system 320, a KOH dosing system 325, electro-coagulation units 330, an oxidizer feed 335, a secondary tank 340, a deep bed filter 345, an ultraviolet light 350, tertiary tank 355, bag filters 360, microfilter 365, quaternary tank 370, dosing system 375 (either HCL or KOH), nanofilters 380, and a backwash system 400. Backwash system 400 functions in a similar manner as the backwash system 210 described above, and will not be repeated here. Backwash system 400 includes an acid tank 405, a base tank 410, a fresh water tank 415, and pumps 420, 425, 430 that carry the fluids from the respective tanks. Backwash system 400 further includes backwash tank 435 and an associated strainer 440 and pump 445. In this embodiment, additional pumps (not shown) may be employed, including both low pressure and high pressure pumps.

In each instance, the component of system 300 may be a larger version of the corresponding component in system 100. Alternatively, multiple components may be employed to scale up the system. For example, in one known embodiment, the system 300 includes 16 nanofilters 380 compared to the two nanofilters 195 of system 100. Additionally, the system 300 includes four microfilters 365 instead of a single microfilter. The system 300 also includes 15 bag filters 360 instead of three. The system 300 further includes a single electro-coagulation unit with four chambers, instead of multiple electro-coagulation units. However, in alternative embodiments, multiple electro-coagulation units may be employed. In certain instances, other types of filters may be employed instead of bag filters.

In the embodiment of FIG. 6, primary tank 315 is a 3,000 gallon tank, secondary tank 340 is a 4,500 gallon tank, tertiary tank 355 is a 6,000 gallon tank, and quaternary tank 370 is a 6,000 gallon tank. Water treatment system 300 further includes three 6,000 gallon product water storage tanks 385, 390, 395.

Shown in FIG. 6, water treatment system 300 includes a solid waste collection system 398 affixed to each of the tanks, similar to the solid waste collection system of water treatment system 100.

Figure 7:
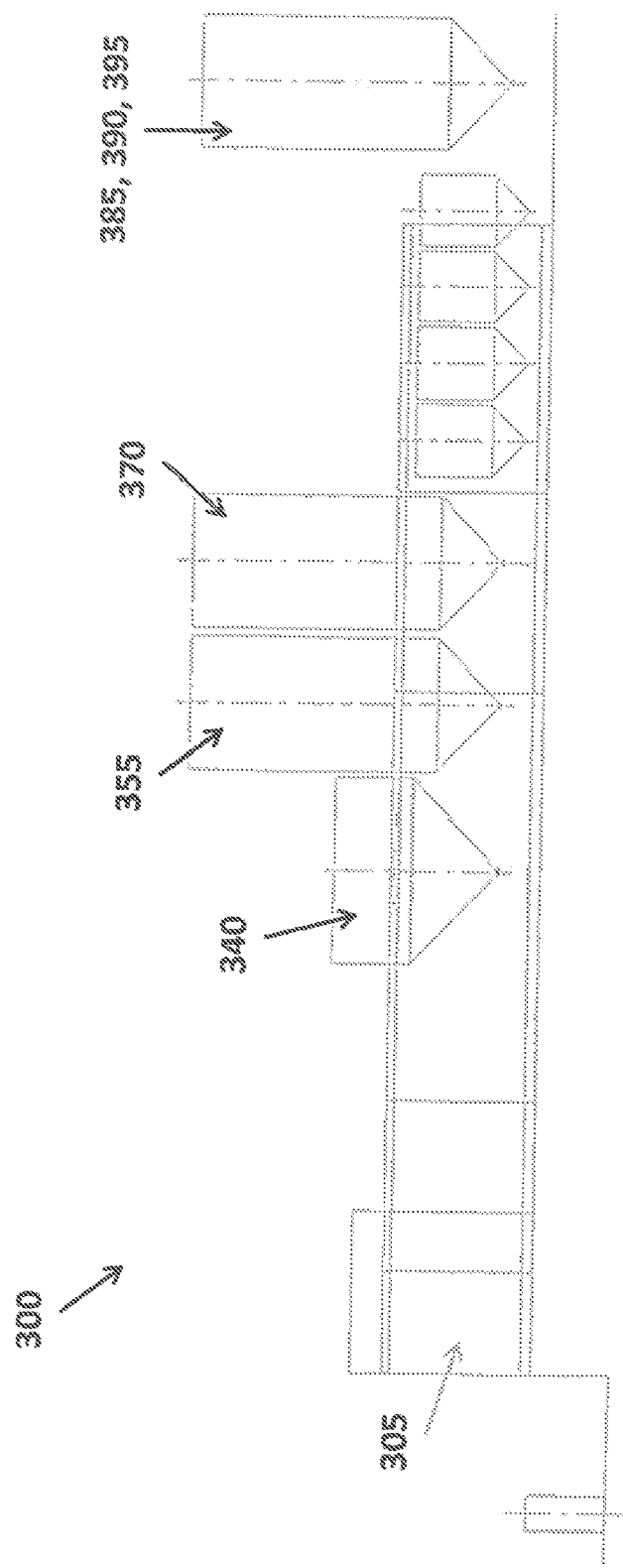
FIG. 7 is an elevation schematic of the embodiment shown in FIG. 6.

FIG. 7 illustrates an elevation schematic of water treatment system 300, in an installation. The system 300 is depicted as a modular system, with certain components located on skids. Thus, some components may be partially assembled on multiple skids at a first location and transported to a second location. The assembly may then be completed at the second location by connecting components on adjacent skids. The system may then be operated for a desired length of time, then disassembled and moved to another location. In this embodiment, all tanks are not located on a skid, and are fixed in place.

Figure 8:
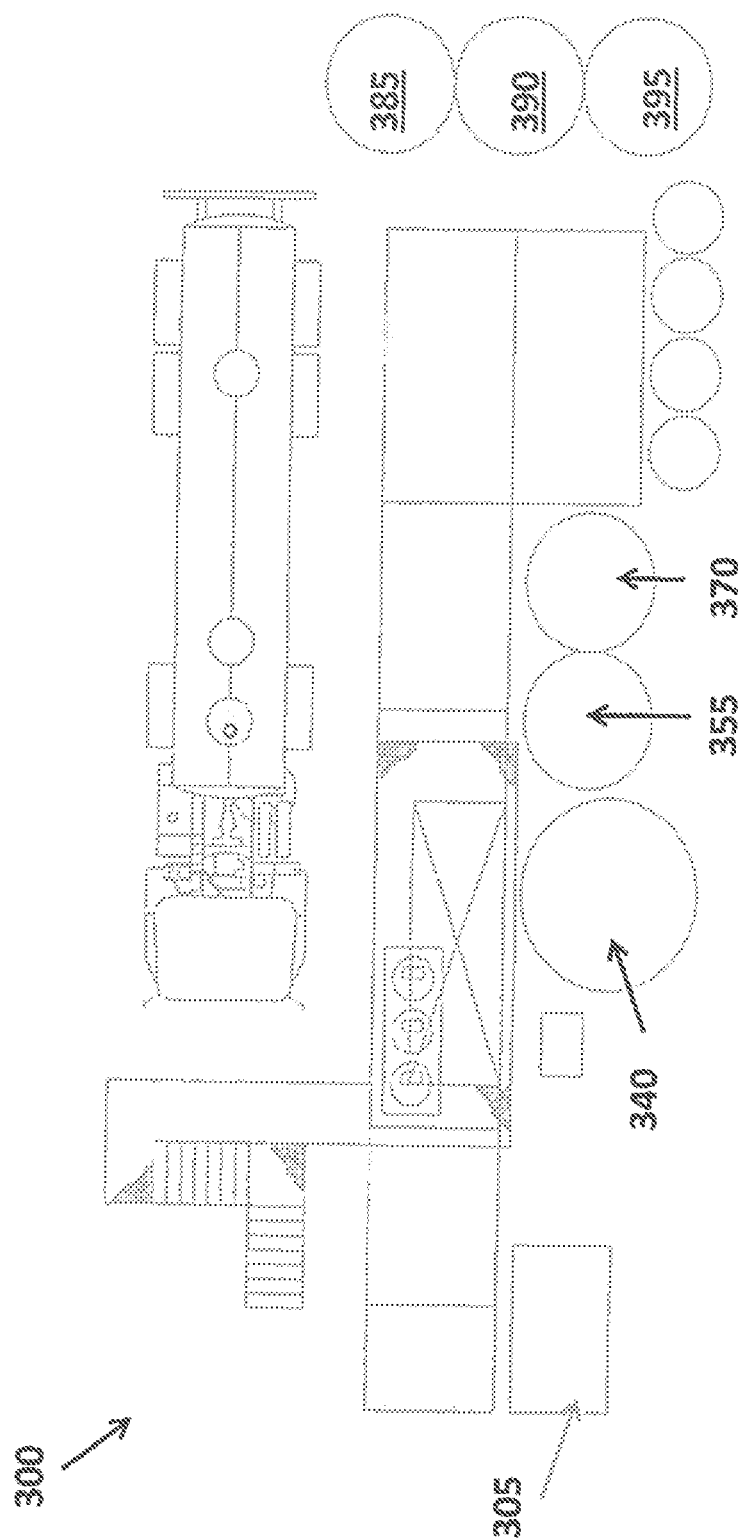
FIG. 8 is an aerial schematic diagram of the embodiment shown in FIG. 6.

FIG. 8 illustrates an aerial schematic of installed water treatment system 300.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A petroleum contact water treatment system comprising:
 a primary tank configured to receive petroleum contact water,
  wherein the primary tank includes a strainer that intercepts particles in the petroleum contact water,
  wherein the primary tank includes a hopper for collecting particles filtered by the primary tank strainer;
 an electro-coagulation unit configured to receive water exiting the primary tank and generate metal hydroxides in the water;
 a secondary tank that receives water from the electro-coagulation unit, the secondary tank configured to separate and drain or vent pollutants in the water;
 an initial filter that receives water from the secondary tank, the initial filter configured to remove pollutants on the order of 1-5 microns;
 a tertiary tank that receives water from the initial filter, the tertiary tank configured to separate and drain pollutants in the water;
 an additional bag filter that receives water from the tertiary tank, the additional bag filter configured to remove pollutants on the order of 1-5 microns;
 a microfilter that receives water from the additional bag filter, the microfilter configured to remove pollutants on the order of 0.1-10 microns;
 a quaternary tank that receives water from the microfilter, the quaternary tank configured to separate and drain pollutants in the water; and
 a nanofilter that receives water from the quaternary tank, the nanofilter configured to remove pollutants on the order of 1-10 nanometers.

2. The petroleum contact water treatment system of claim 1, further including a backwash system configured to pump a cleaning solution through the microfilter and the nanofilter, in a direction opposite to a petroleum contact water intake direction.

3. The petroleum contact water treatment system of claim 1, further including an acid dosing system and a base dosing system connected to the primary tank or the quaternary tank for pH adjustment.

4. The petroleum contact water treatment system of claim 1, further including an ultraviolet light generator configured to expose water to ultraviolet light.

5. The petroleum contact water treatment system of claim 1, wherein a portion of the water exiting the microfilter is re-circulated to the tertiary tank or to the microfilter inlet.

6. The petroleum contact water treatment system of claim 1, wherein a portion of the water exiting the nanofilter is re-circulated to the quaternary tank or to the nanofilter inlet.

7. The petroleum contact water treatment system of claim 1, wherein each of the primary, secondary, tertiary, and quaternary tanks provide pollutants to a discharge drum.

8. The petroleum contact water treatment system of claim 7, wherein the discharge drum provides supernatant water to the primary tank.

9. The petroleum contact water treatment system of claim 1, further including an oxidizer that oxidizes water exiting the electro-coagulation unit.

10. The petroleum contact water treatment system of claim 1, further including a weir and sluice configured to separate froth and liquid from the top surface of the secondary tank for further processing.

11. The petroleum contact water treatment system of claim 1, further including a vapor exhaust removal system, with a regenerative catalytic thermal oxidizer.

12. A petroleum contact water treatment system, comprising:
 a primary tank that mechanically filters petroleum contact water to remove inorganic and organic pollutants from the petroleum contact water;
 an electro-coagulation unit that provides an electrical charge to water exiting the primary screening tank
 a first settling tank that removes pollutants from water exiting the electro-coagulation unit;
 a first set of filters that removes pollutants from water exiting the first settling tank;
 a second settling tank that removes pollutants from water exiting the first set of filters; and
 a second set of filters that removes pollutants from the water exiting the second settling tank.

13. The petroleum contact water treatment system of claim 12, further including a backwash system configured to clean at least one of the filters.

14. The petroleum contact water treatment system of claim 13, wherein the backwash system provides concentrated wastewater to the primary screening tank.

15. The petroleum contact water treatment system of claim 12, wherein the electro-coagulation unit includes at least two electro-coagulation units arranged in parallel.

16. The petroleum contact water treatment system of claim 12, further including one or more acid dosing systems and one or more base dosing systems for pH adjustment.

17. The petroleum contact water treatment system of claim 12, further including an ultraviolet light generator configured to expose wastewater to ultraviolet light.

18. The petroleum contact water treatment system of claim 12, further including a conduit to recirculate finished product water to maintain minimum flow through the piping.

19. A method for treating petroleum contact water, the method comprising the steps of:
 providing petroleum contact water to a primary screening tank;
 removing large pollutants from the petroleum contact water in the primary screening tank;
 providing water from the primary screening tank to an electro-coagulation unit;
 the electro-coagulation unit generating metal hydroxides in the wastewater;
 providing water from the electro-coagulation unit to a first settling tank to allow pollutants in the water to settle at the bottom of the settling tank, or to rise to the surface for removal by skimming;
 providing water from the first settling tank to a first set of filters to remove pollutants from the water;
 providing water from the first set of filters to a second settling tank;

providing water from the second settling tank to a second set of filters;

collecting concentrated wastewater from each settling tank; and providing the collected concentrated wastewater from settling tanks to the primary screening tank.

20. The method of claim 19, further comprising:

exposing the water to ultraviolet light;

injecting air or ozone into one or more settling tanks to agitate the water, aid in flocculating contaminants, and assist in removal of volatile contaminants;

separating froth and liquid from the top surface of the secondary tank for further processing; and removing air and volatile contaminants from the settling tank and oxidizing the vapor or otherwise treating the vapor prior to releasing to the atmosphere.

21. The method of claim 20, further comprising a step of adjusting the pH level of the wastewater in the primary screening tank or the quaternary tank.

22. The method of claim 19, further comprising a step of oxidizing the water.

23. The method of claim 20, further comprising a step of cleaning the filters with a backwash system.

24. The method of claim 20, further comprising a step of re-circulating a portion of the water exiting a filter to a settling tank or to the filter inlet.

25. The method of claim 19, further comprising a step of exposing the water to ultraviolet light.

\* \* \* \* \*